(12) United States Patent
Fuleshwar Prasad et al.

(10) Patent No.: US 10,880,692 B2
(45) Date of Patent: Dec. 29, 2020

(54) DETERMINING POSITIONS OF DEVICES

(71) Applicant: BlackBerry Limited, Waterloo (CA)

(72) Inventors: Mahendra Fuleshwar Prasad, Waterloo (CA); Scott Leonard Dill, Paris (CA); Jesse William Bennett, Apex, NC (US); Jason Wayne Jantzi, St. Clements (CA); Alexander John Ogle, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 15/906,117

(22) Filed: Feb. 27, 2018

(65) Prior Publication Data

US 2019/0037360 A1 Jan. 31, 2019

Related U.S. Application Data

(60) Provisional application No. 62/464,977, filed on Feb. 28, 2017.

(51) Int. Cl.
| | |
|---|---|
| *H04W 4/029* | (2018.01) |
| *G01S 19/48* | (2010.01) |
| *G01S 5/14* | (2006.01) |
| *G01S 19/34* | (2010.01) |
| *G01S 19/38* | (2010.01) |
| *G01S 5/02* | (2010.01) |
| *H04W 52/02* | (2009.01) |
| *H04W 4/02* | (2018.01) |
| *H04W 4/33* | (2018.01) |

(52) U.S. Cl.
CPC .............. *H04W 4/029* (2018.02); *G01S 5/02* (2013.01); *G01S 5/14* (2013.01); *G01S 19/34* (2013.01); *G01S 19/38* (2013.01); *G01S 19/48* (2013.01); *H04W 52/0261* (2013.01); *H04W 52/0274* (2013.01); *H04W 4/02* (2013.01); *H04W 4/025* (2013.01); *H04W 4/33* (2018.02); *Y02D 70/00* (2018.01); *Y02D 70/142* (2018.01); *Y02D 70/144* (2018.01); *Y02D 70/162* (2018.01); *Y02D 70/164* (2018.01); *Y02D 70/20* (2018.01); *Y02D 70/26* (2018.01)

(58) Field of Classification Search
CPC ........ H04W 4/029; H04W 4/02; H04W 4/025
See application file for complete search history.

(56) References Cited

U.S. PATENT DOCUMENTS

| | | | |
|---|---|---|---|
| 7,089,018 B2 * | 8/2006 | Galetti | ................... H04L 67/12 |
| | | | 455/404.2 |
| 7,359,713 B1 | 4/2008 | Tiwari | |
| 2009/0043504 A1 * | 2/2009 | Bandyopadhyay | .... G01C 17/38 |
| | | | 701/469 |

(Continued)

OTHER PUBLICATIONS

Langley, Richard B., GPS World, Dilution of Precision, May 1999 (5 pages).

(Continued)

*Primary Examiner* — Jaime M Holliday
(74) *Attorney, Agent, or Firm* — Trop, Pruner & Hu, P.C.

(57) ABSTRACT

In some examples, a plurality of instances of position data and associated accuracy metadata are acquired by a position sensor. A position of a device comprising the position sensor is determined based on combining the plurality of instances of the position data and the associated accuracy metadata.

19 Claims, 4 Drawing Sheets

(56) References Cited

U.S. PATENT DOCUMENTS

| | | | |
|---|---|---|---|
| 2009/0204354 A1* | 8/2009 | Davis | H04W 84/18 |
| | | | 702/89 |
| 2010/0079336 A1 | 4/2010 | Skibiski et al. | |
| 2010/0171659 A1 | 7/2010 | Waters et al. | |
| 2013/0059609 A1* | 3/2013 | Raento | H04M 1/72572 |
| | | | 455/456.6 |
| 2013/0060640 A1* | 3/2013 | Gadhia | G06Q 30/0251 |
| | | | 705/14.58 |
| 2013/0076523 A1 | 3/2013 | Kwan et al. | |
| 2014/0024392 A1* | 1/2014 | Su | H04W 4/025 |
| | | | 455/456.2 |
| 2015/0036517 A1* | 2/2015 | Ruutu | G01S 5/0036 |
| | | | 370/252 |
| 2015/0373646 A1 | 12/2015 | Toni | |
| 2017/0006430 A1* | 1/2017 | Chao | H04W 4/029 |
| 2018/0014250 A1* | 1/2018 | de Barros Chapiewski | |
| | | | H04W 52/028 |

OTHER PUBLICATIONS

Author Unknown, Principles of GPS Operation downloaded on Feb. 27, 2017 (16 pages).

ISA/US, International Search Report and Written Opinion for PCT/US2018/19844 dated Apr. 19, 2018 (9 pages).

European Patent Office, Extended European Search Report for Appl. No. 18761169.4 dated Nov. 11, 2020 (9 pages).

\* cited by examiner

DETERMINING POSITIONS OF DEVICES

CROSS REFERENCE TO RELATED APPLICATION

This application claims the benefit under 35 U.S.C. § 119(e) of U.S. Provisional Application No. 62/464,977, filed Feb. 28, 2017, which is hereby incorporated by reference in its entirety.

BACKGROUND

A device can include a position sensor that can be used to make measurements to determine a position of the device. In some cases, position sensors include global positioning system (GPS) sensors. A GPS sensor can consume a relatively large amount of power.

BRIEF DESCRIPTION OF THE DRAWINGS

Some implementations of the present disclosure are described with respect to the following figures.

Figure 1:
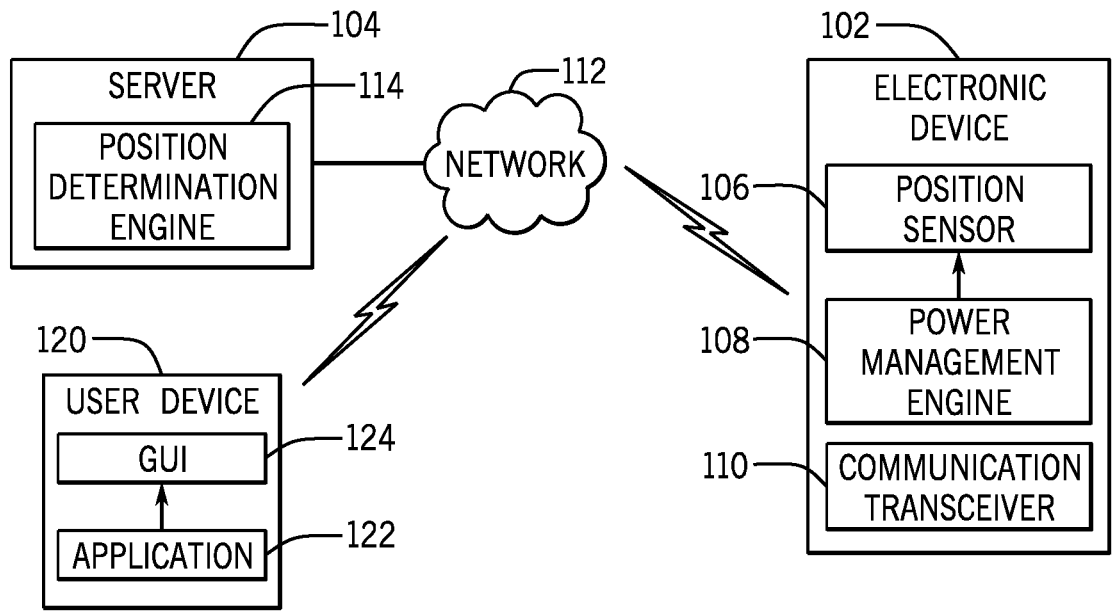
FIG. 1 is a block diagram of an electronic device according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Some electronic devices can run on the power of a battery or another power source with a restricted power capacity. Examples of such electronic devices include smartphones, wearable devices (e.g., smart watches, smart eyeglasses, head-mounted devices, etc.), set-top boxes, sensor devices, household appliances, vehicles (or electronic components in vehicles), Internet-of-Things (IoT) devices, and so forth.

Electronic devices can include position sensors, such as global positioning system (GPS) sensors. When activated, a position sensor can consume a relatively large amount of power, which can quickly deplete a battery or another restricted capacity power source in an electronic device.

To reduce power consumption by a position sensor, the position sensor can be deactivated at certain times, so that the position sensor acquires position data less frequently. However, deactivating a position sensor to reduce power consumption of the position sensor can reduce the accuracy of the position sensor. Therefore, there is a tradeoff between battery life and position sensor accuracy. If the position sensor is continuously activated or activated at more frequent intervals for location tracking, then battery life can be shortened in the electronic device. On the other hand, if the position sensor is activated less frequently, then position accuracy can be degraded, while power consumption of the electronic device can be reduced so that battery life can be extended.

In accordance with some implementations of the present disclosure, solutions are provided to enhance the accuracy of a position sensor in a context where the position sensor is operated in a mode where power consumption of the position sensor is reduced (e.g., the position sensor is activated in some time intervals but deactivated in other time intervals). Solutions according to some implementations can also improve position accuracy under various conditions where position data acquired by the position sensor may not be accurate, such as when the position sensor is located in a dense urban region with tall buildings that can block signals from satellites or other transmitters, or when the position sensor is mounted in a location (such as on a trailer that is attached to a tractor or truck) where certain structures (such as another trailer) can block signals to the position sensor. Inaccuracies in position data can also occur from multipath reflections from buildings, natural terrain, or other structures. In addition, position inaccuracies can occur when the position sensor is located underground, located in a building or a multi-level parking structure, located under a structure such as a bridge, and so forth.

FIG. 1 is a block diagram of an example arrangement that includes an electronic device 102 and a server 104. Although FIG. 1 shows just one electronic device 102, it is noted that in additional examples, there can be multiple electronic devices 102 that include respective position sensors.

The electronic device 102 can be carried by a user or mounted on a moveable platform, such as a trailer or other cargo transportation unit, or a vehicle, such as a truck, a tractor, a car, a railed vehicle (e.g., a train), a watercraft (e.g., a ship), an aircraft, a spacecraft, and so forth.

The electronic device 102 includes a position sensor 106 for acquiring position data that can be measured by the position sensor 106. In some examples, the position sensor is a GPS sensor, which can receive signals from satellites of a satellite navigation system. In other examples, the position sensor 106 can be a different type of position sensor, such as a position sensor that is able to measure signals transmitted by base stations or access points, which are fixed-position wireless transmitters. Based on triangulation using signals from multiple fixed-position transmitters, the position sensor 106 is able to determine a position of the electronic device 102. Base stations are part of a cellular access network, while access points are part of a wireless local area network (WLAN).

The electronic device 102 further includes a power management engine 108, which can manage the power of the electronic device 102 by deactivating one or more components in the electronic device 102, such as to place the electronic device 102 into a lower power state. A low power state of the electronic device 102 can refer to a state in which power is removed from the electronic device 102, or power is removed from one or more electronic components in the electronic device 102, where the one or more electronic components can include any or some combination of the following: a processor, a memory device, a storage device, a network interface controller, a graphics controller, and so forth.

As used here, the term "engine" can refer to a hardware processing circuit, such as a microprocessor, a core of a multi-core microprocessor, a microcontroller, a programmable integrated circuit device, a programmable gate array, or any other type of hardware processing circuit. In other examples, the term "engine" can refer to a combination of a hardware processing circuit and machine-readable instructions executable on the hardware processing circuit.

The power management engine 108 can control when the position sensor 106 is activated such that the position sensor 106 can take measurements to determine a position of the electronic device 102, and when the position sensor 106 is deactivated such that the position sensor 106 does not take measurements. Alternatively, instead of controlling the activation and deactivation of the position sensor 106 using the power management engine 108, the activation/deactivation of the position sensor 106 can be performed autonomously by the position sensor 106, such as based on a fix profile (discussed further below) sent to the position sensor 106 by the server 104.

The electronic device 102 further includes a communication transceiver 110, which can be used by the electronic device 102 to communicate over a network 112. The communication transceiver 110 can be a wireless transceiver, which allows the electronic device 102 to perform wireless communications with the network 112, which can include a cellular access network or a WLAN, or any other type of wireless network. In other examples, the communication transceiver 110 can perform wired communication over the network 112.

The server 104 can be implemented as a computer or as a collection of computers. In some examples, the server 104 can include a web server, a server in a cloud, or any other type of system that is able to communicate with the electronic device 102. The server 104 includes a position determination engine 114, which is able to determine a position of the electronic device 102 based on position data received from the position sensor 106 over the network 112. The position determination engine 114 and the server 104 is able to improve the accuracy of the determined position of the electronic device 102 as compared to position data derived from the position sensor 106 itself, since the position sensor 106 may be infrequently activated or may be located in an area where signals from satellites or other transmitters to the position sensor 106 can be blocked or degraded.

Figure 2:
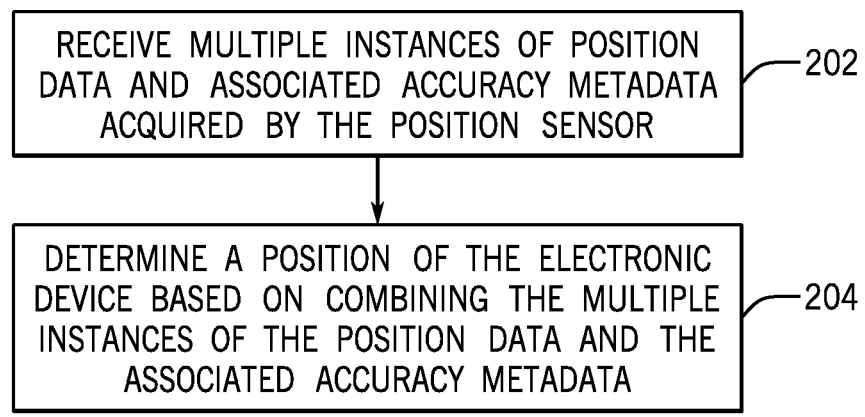
FIG. 2 is a block diagram of example components of an electronic device according to further examples.

FIG. 2 is a flow diagram of a process performed by the position determination engine 114 in the server 104 according to some examples. The position determination engine 114 receives (at 202) multiple instances of position data and associated accuracy metadata acquired by the position sensor 106. In some examples, the position sensor 106 may be operated in a lower power state. The position sensor 106 operated in the lower power state refers to the position sensor 106 being inactive for certain time periods. When the position sensor 106 is in the lower power state, the position sensor 106 acquires the multiple instances of position data and associated accuracy metadata at multiple respective time points, and the position sensor 106 is deactivated between successive time points of the multiple time points. In some examples, the time interval between the successive time points can exceed an hour, two hours, three hours, four hours, five hours, 10 hours, and so forth.

The position determination engine 114 determines (at 204) a position of the electronic device 102 based on combining the multiple instances of the position data and the associated accuracy metadata.

The combining of the multiple instances of the position data and the associated accuracy metadata can be based on use of a Kaman filter, or based on use of a weighted averaging technique. More generally, the combining can be performed by a combiner in the position determination engine 114, where the combiner can apply a Kalman filter, apply a weighted averaging technique, and so forth.

The combiner receives as input the multiple instances of the position data and the associated accuracy metadata, and based on the multiple instances of the position data and the associated accuracy data, the combiner is able to place greater weight on position data that is associated with higher. The combiner outputs a position of the electronic device 102 based on the combining.

The following provides an example of how the position determination engine 114 can provide a position of improved accuracy, using the weighted averaging technique. The position data acquired by the position sensor 106 can include a latitude and a longitude, which can be treated independently by using separate one-dimensional (1D) filters for each. Both a minimum mean square estimate (MMSE) and a maximum likelihood estimate (MLE) for a mean value are given by a weighted average where:

$X_i$ is the i-th measured value (latitude or longitude) from the position sensor 106, $H_i$ is an estimate of the measurement error (proportional to a standard deviation) that can be computed based on accuracy metadata, and $$W_i = \frac{1}{H_i^2}.$$

For all i in a consecutive sequence of stationary measurements of position data (the multiple instances of position data, latitude or longitude, mentioned above, for i=1, ..., N, where N represents the number of measurements), an updated estimated position X' is computed as:

$$X' = \frac{\sum_i X_i W_i}{\sum_i W_i}.$$

The computation of X' can be performed separately for latitude and longitude.

In some examples, all $X_i$ and $H_i$ values can be stored prior to calculation of X'. In some implementations, a new estimate of X' can be computed in response to receipt of each new position measurement (including latitude and longitude), so a recursive technique can be applied where a new estimate of X' can be computed based on a sum of a prior estimate of X' and new correction data (based on the accuracy metadata).

A Kalman filter can provide such a recursive computation.

Additionally, a Kalman filter may be used to calculate similar results as described above, for example, using a stationary and noiseless process model.

The accuracy metadata associated with position data can include at least one metric selected from among horizontal accuracy, three-dimensional (3D) accuracy, horizontal dilution of precision (HDOP), vertical dilution of precision (VDOP), position dilution of precision (PDOP), time dilution of precision (TDOP), and geometric dilution of precision (GDOP).

In examples where the position sensor 106 includes a GPS sensor, factors affecting GPS accuracy can include any or some combination of the following: the number of visible satellites, the geometry of the visible satellites, multipath issues, satellite clock errors, atmospheric effects, receiver effects, and so forth.

GDOP is a value computed based a first difference between output locations produced by the position sensor 106 and a second difference between measured data of the position sensor. GDOP is based on a ratio between the first difference and the second difference. GDOP provides an estimate of satellite conditions for a given location and time, and can be expressed using distance units (e.g., meters or feet).

A lower HDOP value indicates better horizontal resolution. Using satellites from the four compass quadrants can provide a better horizontal resolution (i.e., lower HDOP). Using satellites from only one or two compass quadrants can lead to a poor horizontal solution (i.e., higher HDOP).

Using satellites that are well spread out in the sky can provide a good vertical resolution (i.e., lower VDOP). Using only satellites which are located low on the horizon can result in a poor vertical resolution (i.e., higher VDOP).

PDOP is the combination of both the horizontal and vertical components of position error caused by satellite geometry.

FIG. 1 also shows a user device 120 that can be used to interact with the position determination engine 114 and/or the electronic device 120. The user device 120 can include any or some combination of the following: a smartphone, a tablet computer, a notebook computer, a desktop computer, and so forth.

The user device 120 includes an application 122 that is executable in the user device 120, where the application 122 can present a graphical user interface (GUI) 124 that can be used by a user of the user device 120 to interact with the position determination engine 114 and/or the electronic device 102.

The user device 120 is able to communicate over the network 112 with the sever 104 and/or the electronic device 102. The user at the user device 120 can use the GUI 124 to monitor positions of the electronic device 102 (or multiple electronic devices), or can initiate location monitoring of electronic device(s), or can configure the position determination engine 114 and/or the electronic device 102 for performing position determination of electronic device(s). For example, the user of the user device 120 may be able to configure how often the position sensor 106 is to be activated to provide position data to the position determination engine 114. More generally, the position determination engine 114 can receive from the application 122 configuration information relating to a configuration for determining a location of the electronic device 102 using the position sensor 106. Note that the user device 120 is also able to interact with the electronic device 102 directly over the network 112 for configuring the position sensor 106, or alternatively, the user device 120 can be used to configure the position sensor 106 through the position determination engine 114.

Once the position determination engine 114 determines the position of the electronic device 102 based on multiple instances of position data and associated accuracy metadata from the position sensor 106, the position determination engine 114 can send the determined position to the application 122 at the user device 120 for the GUI 124 to present the determined position.

Figure 3:
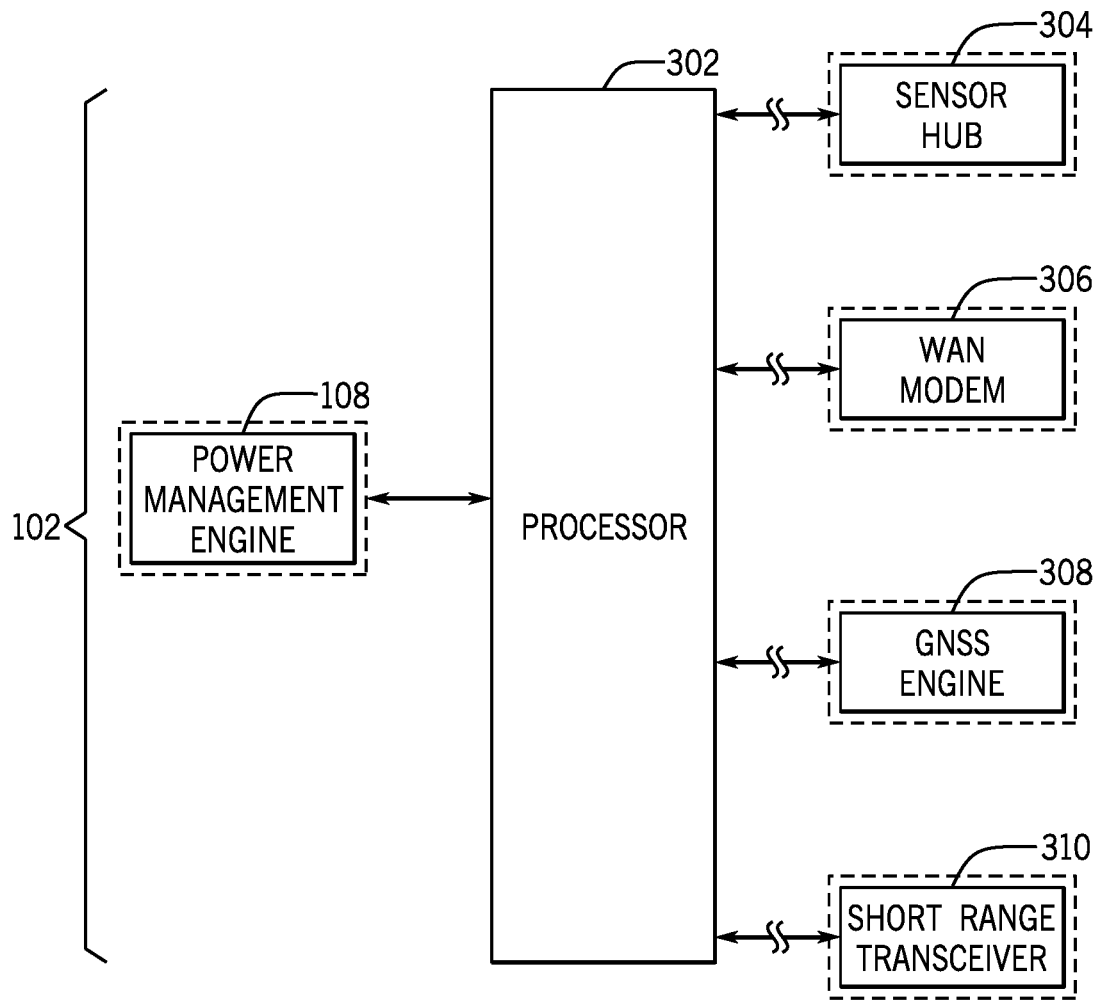
FIG. 3 is a flow diagram of the process according to some examples.

FIG. 3 is a block diagram of example components in the electronic device 102, according to further examples. The components of the electronic device 102 include a processor 302, which is able to communicate over links with a sensor hub 304, a wide area network (WAN) modem 306, a global navigation satellite system (GNSS) engine 308, and a short-range transceiver 310. A processor can include a microprocessor, a core of a multi-core microprocessor, a microcontroller, a programmable integrated circuit, a programmable gate array, or another hardware processing circuit.

The sensor hub 304 can include one or more sensors, such as an accelerometer, a gyroscope, a time-of-flight (ToF) sensor to measure loading within a trailer or other cargo transportation unit, a wheel sensor, a temperature sensor, a humidity sensor, a pressure sensor, and so forth.

The WAN modem 306 is used to communicate over a network (e.g., to communicate over a cellular access network or WLAN). The WAN modem 306 can be an example of the communication transceiver 110 of FIG. 1.

The GNSS engine 308 is able to acquire measurements from satellites, and to derive position data and associated accuracy metadata based on the measurements. The GNSS engine 308 is part of a GPS sensor.

The short-range transceiver 310 allows the electronic device 102 to communicate over a short-range wireless link with another electronic device. For example, the short-range transceiver 310 is able to perform short-range communications over a Bluetooth link, a ZigBee network, a Wi-Fi Direct link, an IPv6 over Low Power Wireless Personal Area Network (6LoWPAN), and so forth. In some examples, the short-range transceiver 310 allows the electronic device 102 to gather sensor data from remote sensor modules, including a GPS sensor, over a short-range wireless link.

The power management engine 108 can selectively control the placement of various electronic components of the electronic device 102 into lower power states, including the processor 302, the WAN modem 306, the GNSS engine 308, and the short-range transceiver 310.

In some examples, the power management engine 108 can place the electronic device 102 into a lower power state by turning off or using the lowest power consumption mode of the processor 302, turning off the WAN modem 306, turning off the short-range transceiver 310, and/or other components.

Moreover, in some cases, the power management engine 108 can cause the GNSS engine 308 to be run autonomously, where the GNSS engine 308 can autonomously turn on or off. When the GNSS engine 308 turns on, the GNSS engine 108 is able to acquire a position fix based on communication with GPS satellites, such that the GNSS engine 108 is able to derive position data and associated accuracy metadata that can be transmitted to the server 104 of FIG. 1.

Autonomous control of the GNSS engine 108 can be based on a fix profile (also referred to as a "power control profile") that can be pushed to the electronic device 102, such as from the server 104 or user device 120 of FIG. 1. The fix profile includes information specifying how often the GNSS receiver 308 is to be activated. For example, the information can specify the periodicity of activation of the GNSS receiver 308 (e.g., the GNSS receiver 308 is activated every X minutes, with the GNSS receiver 308 deactivated in between). In some examples, when the accuracy of the position of the electronic device 102 (as determined by the position determination engine 114) is greater than a specified accuracy threshold (e.g., the accuracy is to within two meters), then a new fix profile can be pushed to the electronic device 102 by the server 104 or user device 120 to reduce the periodicity of acquisition of position fixes. As another example, if the position determined by the position determination engine 114 is not as accurate, such as when the accuracy falls below the specified accuracy threshold, then the periodicity of the position fixes can be increased by sending a different fix profile to the electronic device 102.

In further examples, when the electronic device 102 has been stationary for over some specified time duration, such as 24 hours, then that is an indication that the electronic device 102 will likely not be moved for some amount of time, so that a different fix profile can be pushed to the electronic device 102 to reduce the frequency at which position fixes are acquired.

In addition, the periodicity of the autonomous position fixes can be based on the use case scenario of the electronic device 102, where different use case scenarios can relate to different requirements for position accuracy and battery life of the electronic device 102. When the electronic device 102 is in motion, it may be desirable to track the location of the electronic device 102 as frequently (e.g., every 5 minutes) as possible versus when the electronic device 102 is stationary. A first fix profile can be used when the electronic device 102 is in motion.

When the electronic device 102 is stationary, a second fix profile is used to reduce the frequency of position fixes (e.g., perform position fixes every three hours). However, when the electronic device 102 is stationary, accuracy of its position becomes relatively important, such that increasing the accuracy of the position of the electronic device 102 acquired using less frequently position fixes is performed to improve position accuracy.

The electronic device 102 can also be controlled to determine how often the electronic device 102 sends updates to the server 104. When the electronic device 102 is in motion, updates of position fixes acquired by the GNSS engine 108 can be sent to the server 104 more frequently (e.g., every 15 minutes). This would involve activating the WAN modem 306 to send the server update.

When the electronic device 102 is stationary, the electronic device can send updates of position fixes acquired by the GNSS engine 308 less frequently, such as every 24 hours.

In some examples, the sensor hub 304 can also be caused to run autonomously, where the sensor hub 304 can gather various sensor data when activated at specified time points. The gathered sensor data can include data from the accelerometer, the gyroscope, the wheel sensor, the temperature sensor, the humidity sensor, the pressure sensor, the ToF sensor, and so forth.

Figure 4:
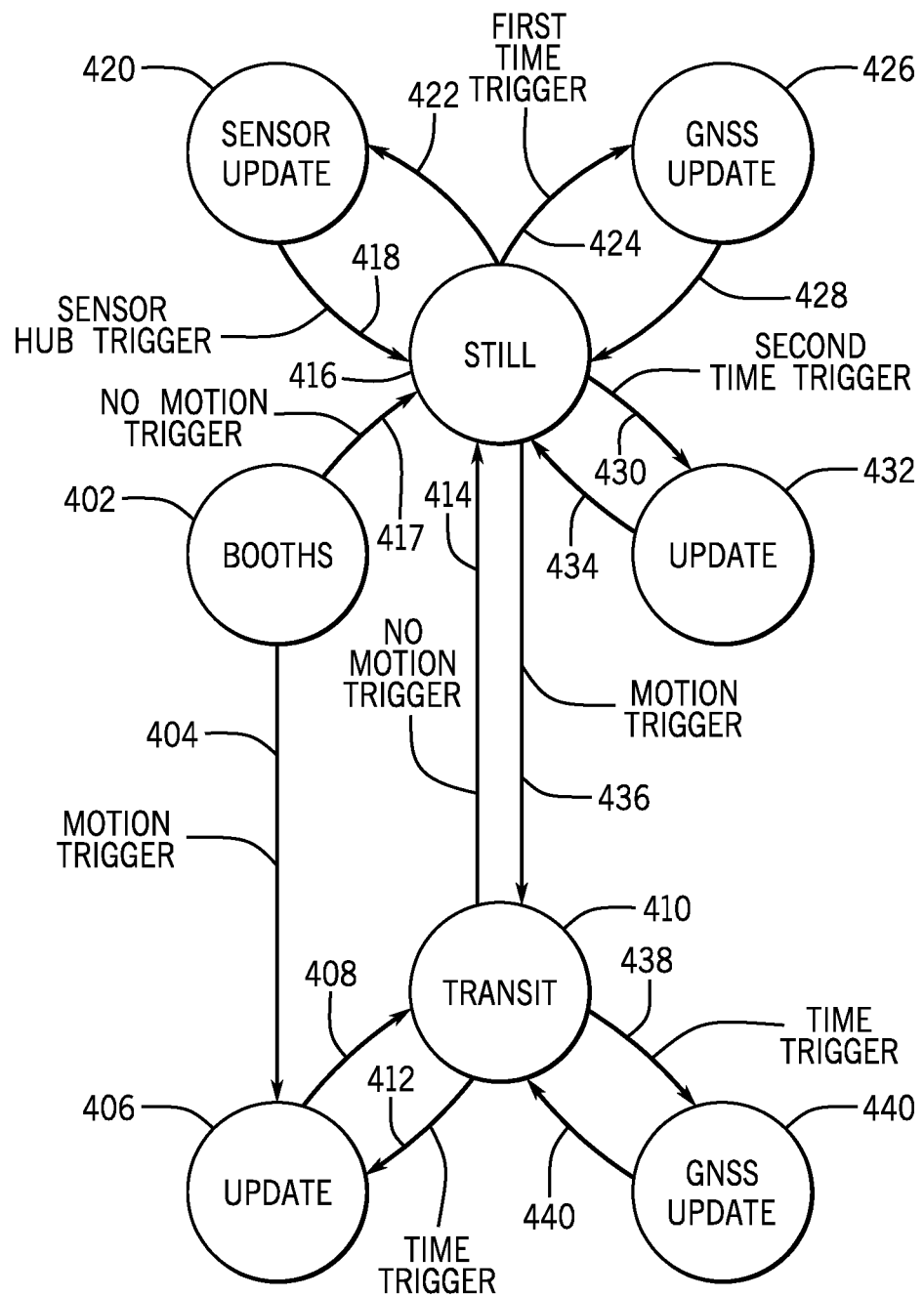
FIG. 4 is a state diagram of state transitions of an electronic device according to further examples.

FIG. 4 is a state diagram showing transitions between different states of the electronic device 102, according to some examples. It is noted that in other examples, different state transitions of the electronic device 102 are possible.

The electronic device 102 begins in a bootup state 402, in which the processor 302 is active, the GNSS engine 308 is acquiring position data, and the WAN modem 308 is active to communicate data from the electronic device 102 (including sensor data of the sensor hub 304) to a remote entity such as the server 104 of FIG. 1.

From the bootup state 402, the electronic device 102 transitions (at 404) to an update state 406 in response to a sensor hub motion trigger, which includes an indication from the sensor hub 304 that a sensor (e.g., an accelerometer) has detected motion of the electronic device 102. In the update state 406, the processor 302 is active, the GNSS engine 308 is acquiring position data, and the WAN modem 308 is active. Also, updated sensor data acquired by the sensor hub 304 can be recorded.

From the update state 406, the electronic device 102 transitions (at 408) to a transit state 410, which corresponds to the electronic device 102 being in motion (transit). For example, the electronic device 102 may be on a moveable platform that has started moving from a stationary state. In the transit state 410, the processor 302 is in a low power state, the GNSS engine 308 is in a low power state, and the WAN modem 308 is in a low power state. Also, in the transit state 410, sensor data acquired by the sensors of the sensor hub 304 are queued in the sensor hub 304.

From the transit state 410, the electronic device 102 transitions (at 412) to the update state 406 in response to a time trigger, such as expiration of a timer that counts a specified time interval (e.g., 5 minutes or other time interval). In the update state 406, the processor 302 is active, the GNSS engine 308 is acquiring position data, and the WAN modem 308 is active, to allow updated position data acquired by the GNSS engine 308 and the queued sensor data of the sensor hub 304 to be transmitted to the server 104.

From the update state 406, the electronic device 102 transitions (at 408) back to the transit state 410.

From the transit state 410, the electronic device 102 transitions (at 414) to a still state 416 in response to a sensor hub no motion trigger, which includes an indication from the sensor hub 304 that a sensor (e.g., an accelerometer) has detected that the electronic device 102 has come to a stop. For example, the electronic device 102 may be on a moveable platform that has come to a stop from a moving state. In the still state 416, the processor 302 is in a low power state, the GNSS engine 308 is in a low power state, and the WAN modem 308 is in a low power state. Also, in the still state 416, sensor data acquired by the sensors of the sensor hub 304 are queued in the sensor hub 304.

Note also that the electronic device 102 transitions (at 417) to the still state 416 from the bootup state 402 in response to a no motion trigger indicating that there has been no motion for longer than a specified time interval.

From the still state 416, several transitions to other states are possible in response to different triggers.

The electronic device 102 transitions (at 418) from the still state 416 to a sensor update state 420 in response to a sensor hub trigger that indicates that a sensor of the sensor hub 104 has detected an event (e.g., a change in sensor reading). In the sensor update state 420, the processor 302 is active, the GNSS engine 308 is acquiring position data, and the WAN modem 308 is active, to allow updated position data acquired by the GNSS engine 308 and the queued sensor data of the sensor hub 304 to be transmitted to the server 104.

The electronic device 102 transitions (at 422) from the sensor update state 420 back to the still state 416.

From the still state 416, the electronic device 102 transitions (at 424) to a GNSS update state 426, in response to a first time trigger indicating that the electronic device 102 has been still for a first specified time interval (e.g., three hours or another time interval). In the GNSS update state 426, the processor 302 is in a low power state, the GNSS engine 308 is acquiring position data, and the WAN modem 308 is in a low power state.

Once the GNSS position data has been acquired and updated, the electronic device 102 transitions (at 428) from the GNSS update state 426 back to the still state 416.

From the still state 416, the electronic device 102 transitions (at 430) to an update state 432, in response to a second time trigger indicating that the electronic device 102 has been still for a second specified time interval (e.g., 24 hours or another time interval). In the update state 430, the processor 302 is active, the GNSS engine 308 is acquiring position data, and the WAN modem 308 is active, to allow updated position data acquired by the GNSS engine 308 and the queued sensor data of the sensor hub 304 to be transmitted to the server 104.

The electronic device 102 transitions (at 434) from the update state 432 back to the still state 416.

From the still state 416, in response to a sensor hub motion trigger, the electronic device 102 transitions (at 436) to the transit state 410.

From the transit state 410, the electronic device 102 transitions (at 438) to a GNSS update state 440, in response to a time trigger indicating that the electronic device 102 has been in motion for a specified time interval (e.g., five minutes or another time interval). In the GNSS update state 438, the processor 302 is in a low power state, the GNSS engine 308 is acquiring position data, and the WAN modem 308 is in a low power state.

Once the GNSS position data has been acquired and updated, the electronic device 102 transitions (at 442) from the GNSS update state 440 back to the transit state 410.

Figure 5:
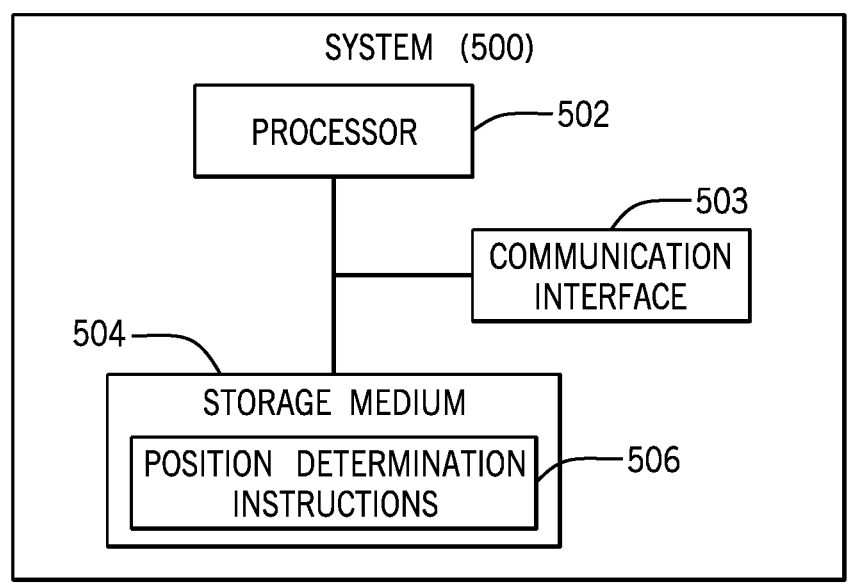
FIG. 5 is a block diagram of a system according to further examples.

FIG. 5 is a block diagram of a system 500, which can be an example of the server 104 of FIG. 1. The system 500 can be implemented using a computer or multiple computers. The system 500 includes a processor 502 (or multiple processors). The system 500 further includes a communication interface 503 including a transceiver and protocol layers of a protocol stack to communicate over a network, such as the network 112 of FIG. 1.

The system 500 also a non-transitory machine-readable or computer-readable storage medium 504 storing machine-readable instructions that upon execution perform various tasks. The machine-readable instructions include position determination instructions 504 that can perform the tasks of the position determination engine 114 as explained above.

The storage medium 504 storing machine-readable instructions can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
a processor; and
a non-transitory storage medium storing instructions executable on the processor to:
when the instructions determine that a first accuracy of a determined position of a device comprising a position sensor exceeds an accuracy threshold at a first time:
select, from a plurality of different power control profiles based on the first accuracy, a first power control profile, the different power control profiles corresponding to different accuracies in device positioning, and each power control profile of the different power control profiles specifying a respective periodicity of activation of the position sensor to acquire position data;
send the first power control profile over a network to the device;
receive a first plurality of instances of position data and associated first accuracy metadata acquired by the position sensor at a first non-zero periodicity specified by the first power control profile; and
determine a position of the device based on combining the first plurality of instances of position data and the associated first accuracy metadata;
when the instructions determine that a second accuracy of a determined position of the device is less than the accuracy threshold at a second time:
select, from the plurality of different power control profiles based on the second accuracy, a second power control profile;
send the second power control profile over the network to the device;
receive a second plurality of instances of position data and associated second accuracy metadata acquired by the position sensor at a second non-zero periodicity specified by the second power control profile, the second non-zero periodicity being different from the first non-zero periodicity; and
determine a position of the device based on combining the second plurality of instances of position data and the associated second accuracy metadata.

2. The system of claim 1, wherein the first plurality of instances of position data and the associated first accuracy metadata are acquired by the position sensor in a lower power state.

3. The system of claim 2, wherein the position sensor in the lower power state is to acquire the first plurality of instances of position data and the associated first accuracy metadata at a plurality of time points according to the first non-zero periodicity specified by the first power control profile, and the position sensor is deactivated between successive time points of the plurality of time points.

4. The system of claim 3, wherein a time interval between the successive time points of the plurality of time points exceeds an hour according to the first non-zero periodicity specified by the first power control profile.

5. The system of claim 1, wherein the first plurality of instances of position data and the associated first accuracy metadata are acquired by the position sensor located in an area where signals to the position sensor are blocked or degraded.

6. The system of claim 1, wherein the instructions are executable on the processor to use a Kalman filter to combine the first plurality of instances of position data and the associated first accuracy metadata.

7. The system of claim 1, wherein the instructions are executable on the processor to use a weighted averaging technique to combine the first plurality of instances of position data and the associated first accuracy metadata.

8. The system of claim 1, wherein the first accuracy metadata comprises at least one metric selected from among horizontal accuracy, three-dimensional (3D) accuracy, horizontal dilution of precision (HDOP), vertical dilution of precision (VDOP), position dilution of precision (PDOP), time dilution of precision (TDOP), and geometric dilution of precision (GDOP).

9. The system of claim 1, wherein the device comprises a moveable platform, and wherein the first plurality of instances of position data and the associated first accuracy metadata were acquired by the position sensor while the moveable platform is stationary.

10. The system of claim 1, wherein the device comprises a moveable platform, and wherein the first plurality of instances of position data and the associated first accuracy metadata were acquired by the position sensor while the moveable platform is moving.

11. The system of claim 1, wherein the instructions are executable on the processor to:
receive, from an application executing in a user device, configuration information relating to a configuration for determining a location of the device using the position sensor.

12. The system of claim 11, wherein the instructions are executable on the processor to:
send, to the application executing in the user device, the determined position of the device based on combining the first plurality of instances of position data and the associated first accuracy metadata.

13. The system of claim 1, wherein the system is separate from the device, and wherein the first plurality of instances of position data and the associated first accuracy metadata are received from the device over the network by the system.

14. A method performed by a system comprising a hardware processor, comprising:
when the system determines that a first accuracy of a determined position of a device comprising a position sensor exceeds an accuracy threshold at a first time:
selecting, from a plurality of different power control profiles based on the first accuracy, a first power control profile, the different power control profiles corresponding to different accuracies in device positioning, and each power control profile of the different power control profiles specifying a respective periodicity of activation of the position sensor to acquire position data;
sending the first power control profile over a network to the device;
receiving, over the network, a first plurality of instances of position data and associated first accuracy metadata acquired by the position sensor at a first non-zero periodicity specified by the first power control profile; and
determining a position of the device based on combining the first plurality of instances of position data and the associated first accuracy metadata;
when the system determines that a second accuracy of a determined position of the device is less than the accuracy threshold at a second time:
selecting, from the plurality of different power control profiles based on the second accuracy, a second power control profile;
sending the second power control profile over the network to the device;
receiving a second plurality of instances of position data and associated second accuracy metadata acquired by the position sensor at a second, non-zero periodicity specified by the second power control profile, the second non-zero periodicity being different from the first non-zero periodicity; and
determining a position of the device based on combining the second plurality of instances of position data and the associated second accuracy metadata.

15. The method of claim 14, wherein the first plurality of instances of position data and the associated first accuracy metadata are acquired by the position sensor in a lower power state, wherein the position sensor in the lower power state acquires the first plurality of instances of position data and the associated first accuracy metadata at a plurality of time points according to the first non-zero periodicity specified by the first power control profile, and the position sensor is deactivated between successive time points of the plurality of time points.

16. A non-transitory machine-readable storage medium storing instructions that upon execution cause a system to:
when the instructions determine that a first accuracy of a determined position of a device comprising a position sensor exceeds an accuracy threshold at a first time:
select, from a plurality of different power control profiles based on the first accuracy, a first power control profile, the different power control profiles corresponding to different accuracies in device positioning, and each power control profile of the different power control profiles specifying a respective periodicity of activation of the position sensor to acquire position data;
send the first power control profile over a network to the device;
receive a first plurality of instances of position data and associated first accuracy metadata acquired by the position sensor at a first non-zero periodicity specified by the first power control profile; and
determine a position of the device based on combining the first plurality of instances of position data and the associated first accuracy metadata;
when the instructions determine that a second accuracy of a determined position of the device is less than the accuracy threshold at a second time:
select, from the plurality of different power control profiles based on the second accuracy, a second power control profile;
send the second power control profile over the network to the device;
receive a second plurality of instances of position data and associated second accuracy metadata acquired by the position sensor at a second, non-zero periodicity specified by the second power control profile, the second non-zero periodicity being different from the first non-zero periodicity; and
determine a position of the device based on combining the second plurality of instances of position data and the associated second accuracy metadata.

17. The non-transitory machine-readable storage medium of claim 16, wherein the instructions upon execution cause the system to use a Kalman filter to combine the first plurality of instances of position data and the associated first accuracy metadata.

18. The non-transitory machine-readable storage medium of claim 16, wherein the instructions upon execution cause the system to use a weighted averaging technique to combine the first plurality of instances of position data and the associated first accuracy metadata.

19. The non-transitory machine-readable storage medium of claim 16, wherein the device comprises a moveable platform, and wherein the first plurality of instances of position data and associated first accuracy metadata were acquired by the position sensor while the moveable platform is stationary.

* * * * *